US009571718B2

(12) United States Patent
Suzuki et al.

(10) Patent No.: US 9,571,718 B2
(45) Date of Patent: Feb. 14, 2017

(54) IMAGE PROCESSING APPARATUS, IMAGE PROCESSING METHOD, NON-TRANSITORY COMPUTER-READABLE STORAGE MEDIUM AND IMAGE PICKUP APPARATUS FOR PROCESSING A PICKED-UP IMAGE

(71) Applicants: Satoshi Suzuki, Tokyo (JP); Hirokazu Kobayashi, Saitama (JP)

(72) Inventors: Satoshi Suzuki, Tokyo (JP); Hirokazu Kobayashi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 251 days.

(21) Appl. No.: 14/019,693

(22) Filed: Sep. 6, 2013

(65) Prior Publication Data

US 2014/0168484 A1    Jun. 19, 2014

(30) Foreign Application Priority Data

Sep. 11, 2012   (JP) .................................. 2012-199449

(51) Int. Cl.
*H04N 9/64* (2006.01)
*H04N 5/225* (2006.01)
*H04N 5/232* (2006.01)

(52) U.S. Cl.
CPC ................................. *H04N 5/23212* (2013.01)

(58) Field of Classification Search
CPC .................. G02B 27/0075; G02B 2027/0138; G02B 7/36; G02B 2027/0112; G02B 2027/0123; G02B 2027/0147; H04N 5/23212; H04N 5/367; H04N 9/045
See application file for complete search history.

(56) References Cited

U.S. PATENT DOCUMENTS

| 8,531,560 B2 * | 9/2013 | Kimura | .................. G02B 7/102 348/247 |
| 2011/0109775 A1* | 5/2011 | Amano | .............. H04N 5/23212 348/241 |

(Continued)

FOREIGN PATENT DOCUMENTS

| CN | 102203655 A | 9/2011 |
| CN | 102246079 A | 11/2011 |

(Continued)

OTHER PUBLICATIONS

Kimura, WO 2010/067693 A1 (Focus Detection Apparatus and Method for Controlling the Same), Jun. 17, 2010.*

(Continued)

*Primary Examiner* — Twyler Haskins
*Assistant Examiner* — Carrahmah J Quiett
(74) *Attorney, Agent, or Firm* — Carter, DeLuca, Farrell & Schmidt, LLP

(57) ABSTRACT

An image processing apparatus for processing a picked-up image which is output from an image pickup element in which a microlens array for obtaining the picked-up image including ray directional information of an object image formed by a photographing optical system has been arranged has: a refocus processing unit for executing a refocus processing of the obtained picked-up image on the basis of the ray directional information and generating a reconstruction image; and a defect pixel detection unit for detecting a defect pixel from the obtained picked-up image. When the picked-up image is obtained, the detection of the defect pixel of the obtained picked-up image is performed. When a refocus processing is instructed, the refocus processing is executed to the picked-up image in which the detection of the defect pixel is performed.

17 Claims, 10 Drawing Sheets

(56) References Cited

U.S. PATENT DOCUMENTS

2011/0164166 A1* 7/2011 Oikawa ................... 348/340
2011/0228145 A1* 9/2011 Kimura ............... G02B 7/102
                                                    348/247

FOREIGN PATENT DOCUMENTS

| JP | S61-261974 A | 11/1986 |
| JP | 2005-026794 A | 1/2005 |
| JP | 2005-286825 A | 10/2005 |
| JP | 2009224982 A | 10/2009 |
| JP | 2010-252105 A | 11/2010 |

OTHER PUBLICATIONS

Ren Ng, et al., "Light Field Photography with a Hand-Held Plenoptic Camera", Stanford University Computer Science Tech Report CTSR 2005-02, Apr. 2005 (2 pages).
Korean Office Action issued in corresponding application No. 10-2013-0105856 on Sep. 1, 2015.
Office Action issued in corresponding Chinese Application No. 201310412980.1 on May 5, 2016.

* cited by examiner

FIG. 4

| p11 | p12 | p13 | p14 | p15 | p16 |
| p21 | p22 | p23 | p24 | p25 | p26 |
| p31 | p32 | p33 | p34 | p35 | p36 |
| p41 | p42 | p43 | p44 | p45 | p46 |
| p51 | p52 | p53 | p54 | p55 | p56 |
| p61 | p62 | p63 | p64 | p65 | p66 |

FIG. 5

| a66 | a65 | a64 | a63 | a62 | a61 |
| a56 | a55 | a54 | a53 | a52 | a51 |
| a46 | a45 | a44 | a43 | a42 | a41 |
| a36 | a35 | a34 | a33 | a32 | a31 |
| a26 | a25 | a24 | a23 | a22 | a21 |
| a16 | a15 | a14 | a13 | a12 | a11 |

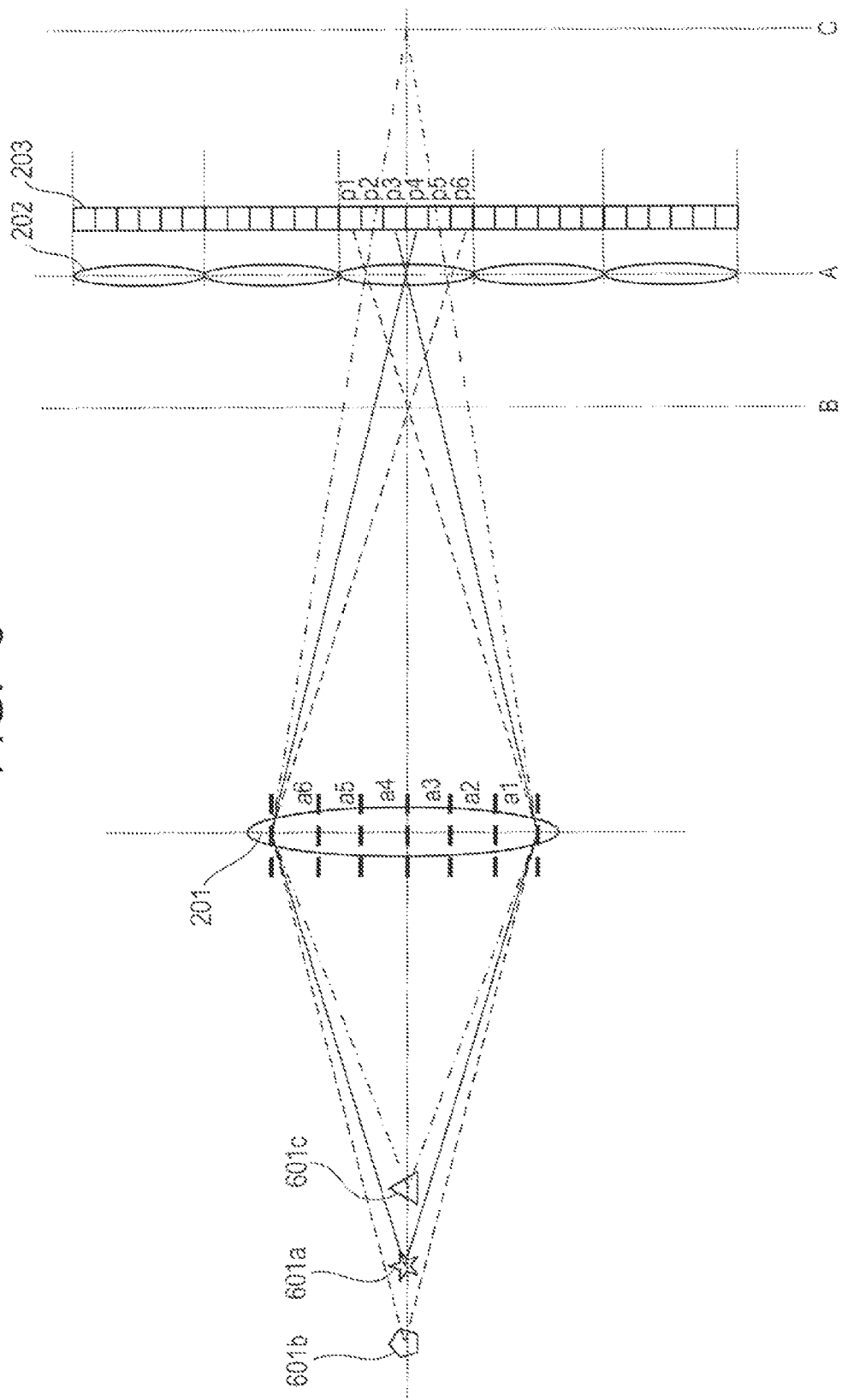

FIG. 10A

|     |     |     |     |     |     |
| --- | --- | --- | --- | --- | --- |
| p11 | p12 | p13 | p14 | p15 | p16 |
| p21 | p22 | p23 | p24 | p25 | p26 |
| p31 | p32 | p33 | p34 | p35 | p36 |
| p41 | p42 | p43 | p44 | p45 | p46 |
| p51 | p52 | p53 | p54 | p55 | p56 |
| p61 | p62 | p63 | p64 | p65 | p66 |

FIG. 10B

|     |     |     |     |     |     |
| --- | --- | --- | --- | --- | --- |
| p11 | p12 | p13 | p14 | p15 | p16 |
| p21 | p22 | p23 | p24 | p25 | p26 |
| p31 | p32 | p33 | p34 | p35 | p36 |
| p41 | p42 | p43 | p44 | p45 | p46 |
| p51 | p52 | p53 | p54 | p55 | p56 |
| p61 | p62 | p63 | p64 | p65 | p66 |

IMAGE PROCESSING APPARATUS, IMAGE PROCESSING METHOD, NON-TRANSITORY COMPUTER-READABLE STORAGE MEDIUM AND IMAGE PICKUP APPARATUS FOR PROCESSING A PICKED-UP IMAGE

BACKGROUND OF THE INVENTION

Field of the Invention

The present invention relates to an image processing apparatus and, more particularly, to an image processing apparatus for processing a picked-up image obtained by an image pickup element having a microlens array at a front side thereof.

Description of the Related Art

In the related art, there exist many image pickup apparatuses such as an electronic camera and the like for recording and reproducing a still image or a moving image picked up by an image pickup element such as CCD, CMOS, or the like to/from a recording medium serving as a memory card having a memory element.

An example of techniques regarding those image pickup apparatuses has been proposed in Japanese Patent Application Laid-Open No. S61-261974. Such an image pickup apparatus is constructed in such a manner that a microlens array (hereinbelow, abbreviated to an MLA) in which microlenses are arranged at a rate of one to a predetermined number of plurality of pixels is arranged at a front side of an image pickup element, thereby enabling incident direction information of a ray of light (ray directional information) which enters the image pickup element to be also obtained.

Although such an image pickup apparatus is called a Hand-held Plenoptic Camera in Ren. Ng. and 7 others, "Light Field Photography with a Hand-held Plenoptic Camera", Stanford Tech Report CTSR 2005-02, it is generally also called a "Light Field Camera".

As an application of such an image pickup apparatus, a normal photographed image is generated on the basis of an output signal from each pixel. As another application, a predetermined image processing based on the ray directional information is executed to a photographed image, thereby reconstructing an image focused to an arbitrary focal length (such a processing is called a refocus processing), or the like.

On the other hand, among recent electronic cameras, there exist many cameras each of which is equipped with an image pickup element having millions to tens of millions pixels. However, it is practically very difficult to manufacture an image pickup element in which all pixels properly perform a conversion into an electric signal corresponding to an incident light amount. Thus, several "defect pixels" which do not normally operate exist mixedly in the "pixels" of the image pickup element.

In the image pickup apparatus in the related art, an interpolation processing or the like using an image signal of a peripheral pixel of the defect pixel is executed, thereby correcting an image which is finally generated.

There are several methods of detecting the defect pixel which is a correction subject. For example, in a manufacturing step of the image pickup apparatus or image pickup element, methods which record and store an address of the defect pixel in a memory of the image pickup apparatus on the basis of the photographed image have been proposed in Japanese Patent Application Laid-Open No. S61-261974, and Japanese Patent Application Laid-Open No. 2005-026794, and the like.

As another detecting method, there is a real-time defect pixel detecting method of discriminating the defect pixel based on a level difference or the like from the image signal of the peripheral pixel of the picked-up image every photographing by the image pickup apparatus. Such a method has been proposed in Japanese Patent Application Laid-Open No. 2005-286825, or the like.

However, in the photographing by the image pickup apparatus having the MLA as mentioned above, in order to realize the real-time detection of the defect pixel, there is the following problem.

That is, in the real-time detecting method of the defect pixel, on the basis of the level difference between the detection subject pixel and its peripheral pixel, whether or not that detection subject pixel is a defect pixel is discriminated. However, among the image pickup apparatuses having the MLA mentioned above, the image pickup apparatus based on a prerequisite that the reconstruction for executing the predetermined image processing such as a refocus processing or the like is performed has the following problem. That is, an arrangement of the pixel signals at the time of reading out from the image pickup element or at the time of storing the image data is not always an arrangement corresponding to a positional relationship of the object images, and thus the image data is of data which may not be suitable for direct display to observe. Therefore, if such an arrangement is used as it is, it is difficult to discriminate whether or not the detection subject pixel is a defect, based on the peripheral pixel signal of the defect pixel as shown in Japanese Patent Application Laid-Open No. 2005-286825.

But, in order to detect the defect pixel, if some reconstruction processing is executed in order to obtain the image data which is suitable for direct display to observe the image which is used for detection, one pixel signal of the image obtained after the reconstruction becomes a signal generated by adding pixel signals of the plurality of image pickup element. Consequently, it is further difficult to detect which pixel of the image pickup element is a defect pixel, based on the pixel signal of the reconstruction image.

SUMMARY OF THE INVENTION

Therefore, an aspect of the invention is to provide an image processing apparatus, image processing method, and program for enabling a proper defect pixel detection to be performed to a picked-up image obtained by an image pickup element having an MLA.

To solve the above problems, according to the invention, an image processing apparatus for processing a picked-up image which is output from an image pickup element with which a microlens array for obtaining the picked-up image including ray directional information of an object image formed by a photographing optical system is arranged, comprises: a refocus processing unit configured to execute a refocus processing of the obtained picked-up image on the basis of the ray directional information and generate a reconstruction image; and a defect pixel detection unit configured to detect a defect pixel from the obtained picked-up image, wherein in a case where the picked-up image is obtained, the detection of the defect pixel of the obtained picked-up image is performed, and in a case where the refocus processing is instructed, the refocus processing is executed to the picked-up image in which the detection of the defect pixel is performed.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a constructional diagram of a unit pixel constructing the pixel array in FIG. 4.

FIG. 5 is a diagram in the case where an aperture of a photographing lens in the image pickup optical system in FIG. 2 is seen from the object direction.

FIG. 6 is a diagram illustrating traces of rays of light from objects in the image pickup optical system in FIG. 2.

FIGS. 10A and 10B are diagrams for describing a detecting method of the defect pixel according to the first embodiment of the invention.

DESCRIPTION OF THE EMBODIMENTS

Various exemplary embodiments, features, and aspects of the present invention will be described in detail below with reference to the drawings.

First Embodiment

Figure 1:
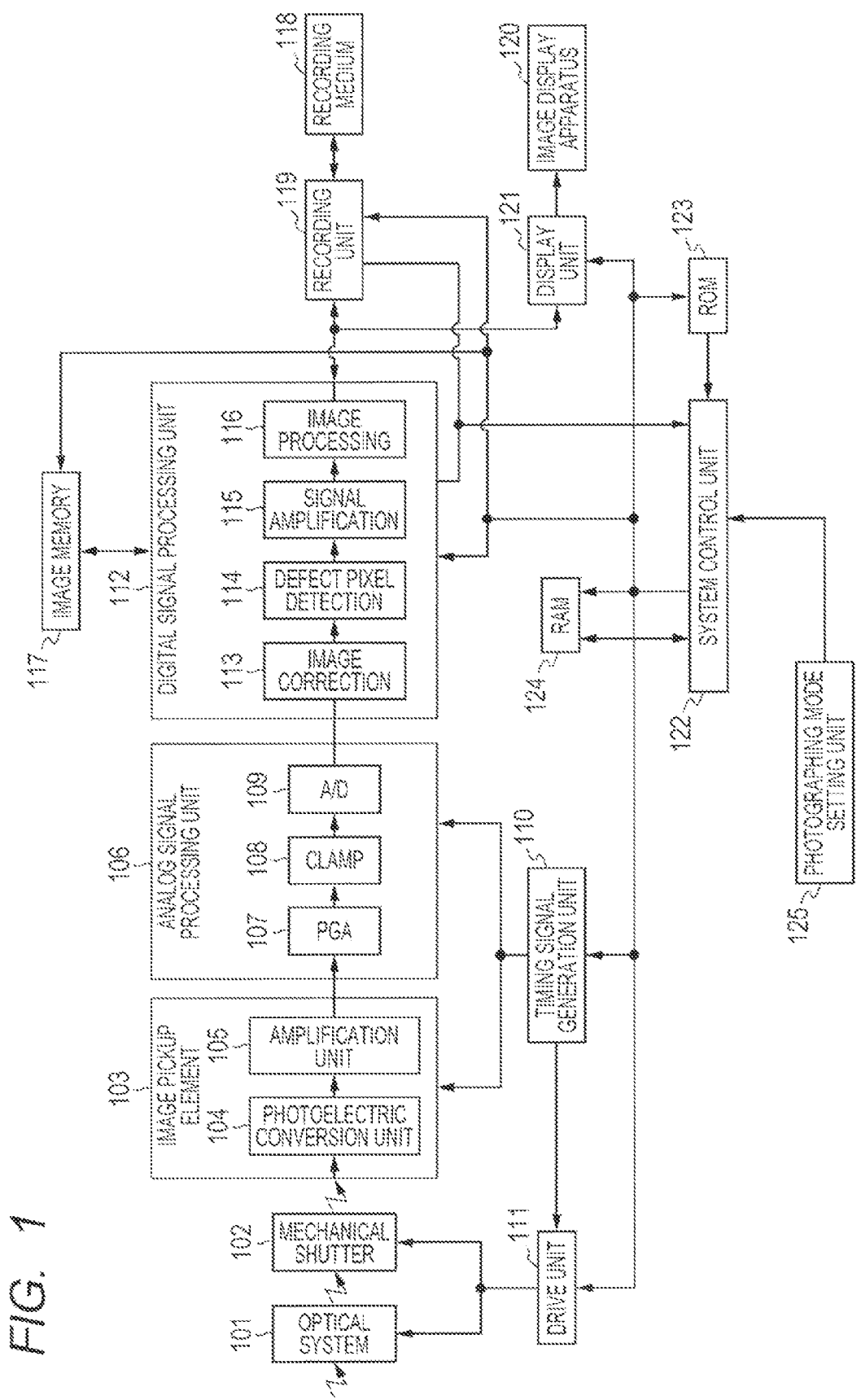
FIG. 1 is a block diagram of an image pickup apparatus according to the first embodiment of the invention.

FIG. 1 is a block diagram of an image pickup apparatus according to the first embodiment of the invention.

In FIG. 1, an optical system 101 for photographing, such as lenses or the like, a mechanical shutter 102, and an image pickup element 103 for converting incident light into an electric signal are provided. The image pickup element 103 has: a photoelectric conversion unit 104 for converting the incident light into the electric signal; and a signal amplification unit 105 for amplifying the electric signal.

An analog signal processing unit 106 obtains an image signal which is output from the image pickup element 103 and executes an analog signal processing thereon. The analog signal processing unit 106 has: a signal amplifier 107 for amplifying the analog signal; a clamp unit 108 for performing a horizontal OB clamp; and an A/D converter 109 for converting the analog signal into the digital signal.

A timing signal generation unit 110 generates signals for making the image pickup element 103 and the analog signal processing unit 106 operative. A drive unit 111 drives the optical system 101 and the mechanical shutter 102. A digital signal processing unit 112 executes a necessary digital signal processing to photographed image data. The digital signal processing unit 112 includes: an image correction unit 113; a defect pixel detection unit 114 for performing a defect pixel detection according to the present embodiment; a signal amplification unit 115 for amplifying the digital signal; and an image processing unit 116 for executing a necessary image processing to the image data.

An image memory 117 stores the signal-processed image data. An image recording medium (shown as a recording medium) 118 is detachable from the image pickup apparatus. A recording unit 119 records the signal-processed image data into the image recording medium 118. An image display apparatus 120 displays the signal-processed image data. A display unit 121 displays the image onto the image display apparatus 120.

A system control unit 122 controls the whole image pickup apparatus. A nonvolatile memory (ROM) 123 stores: a program describing a control method which is executed by the system control unit 122; control data such as parameters, tables, and the like which are used when executing the program; and correction data such as defect addresses and the like. A volatile memory (RAM) 124 to which the program, control data, and correction data stored in the nonvolatile memory 123 are transferred and stored, is used when the system control unit 122 controls the image pickup apparatus.

A photographing mode setting unit 125 performs a photographing condition setting such as ISO sensitivity setting and the like, a switching between a still image photographing and a live-view driving, and the like.

The photographing operation of the image pickup apparatus constructed as mentioned above according to the present embodiment will be described hereinbelow.

It is assumed that prior to the photographing operation, the necessary program, control data, and correction data are transferred from the nonvolatile memory 123 and stored into the volatile memory 124 at the time of start of the operation of the system control unit 122 such as the time of turn-on of a power source of the image pickup apparatus or the like. Those program and data are used when the system control unit 122 controls the image pickup apparatus. However, the system control unit 122 may be also constructed in such a manner that additional program and data can be transferred from the nonvolatile memory 123 into the volatile memory 124 or the data in the nonvolatile memory 123 can be directly read out and used in accordance with necessity.

First, the optical system 101 such as lenses or the like is driven by a control signal from the system control unit 122 and forms an object image which has been set to proper brightness onto the image pickup element 103. Subsequently, in the still image photographing mode, the mechanical shutter 102 is driven by a control signal from the system control unit 122 so as to shield the image pickup element 103 from the light in accordance with the operation of the image pickup element 103 so that a necessary exposure time is obtained. At this time, if the image pickup element 103 has an electronic shutter function, the necessary exposure time may be assured in cooperation with the mechanical shutter 102. In the moving image photographing mode and the live-view driving mode, the mechanical shutter 102 is maintained in an open state by a control signal from the system control unit 122 so that the image pickup element 103 is always exposed during the photographing.

The image pickup element 103 is driven by a drive pulse based on an operation pulse which is generated by the timing signal generation unit 110 which is controlled by the system control unit 122. The photoelectric conversion unit 104 converts the object image into the electric signal by the photoelectric conversion. The signal amplification unit 105 multiplies the electric signal with a gain of an amplification factor which input in accordance with the incident light amount and outputs a resultant signal as an analog image signal.

The analog image signal which is output from the image pickup element 103 is processed by the analog signal processing unit 106 by the operation pulse which is generated by the timing signal generation unit 110 which is controlled by the system control unit 122. First, the PGA unit 107 multiplies the gain of the amplification factor which is set in accordance with the incident light amount. The clamp unit 108 clamps a signal output in a horizontal OB area as a reference voltage. The A/D converter 109 converts the clamped signal into a digital image signal.

Subsequently, the digital image signal which is output from the analog signal processing unit 106 is subjected to image processings such as color conversion, white balance, gamma correction, and the like, a resolution conversion processing, an image compression processing, and the like by the digital signal processing unit 112 which is controlled by the system control unit 122.

First, in the image correction unit 113, the defect pixel is corrected, various kinds of image correction processings such as dark shading correction and the like are executed. The defect pixel is detected from the picked-up image by the defect pixel detection unit 114. The defect pixel which is corrected by the image correction unit 113 is a pixel which has previously been detected in a manufacturing step or the like of the image pickup element 103 and in which information such as a position and the like of such a pixel has been recorded. The defect pixel which is detected by the defect pixel detection unit 114 is a pixel which is not detected in the manufacturing step or the like of the image pickup element 103 and has newly become a defect in the subsequent step, a pixel such as an RTS noise which became a defect or does not become a defect every photographing, or the like.

After that, the gain of the amplification factor which has been set in accordance with the incident light amount is multiplied in the signal amplification unit 115. The image processings such as color conversion, white balance, gamma correction, and the like and various kinds of image processings such as resolution conversion processing, image compression processing, and the like are executed in the image processing unit 116. The refocus processing based on the ray directional information as mentioned above is also executed in the image processing unit 116.

The image memory 117 is used to temporarily store the digital image signal during the signal processing or store the image data serving as a signal-processed digital image signal. The image data which is signal-processed in the digital signal processing unit 112 and the image data stored in the image memory 117 are input into the recording unit 119 and are converted into data (for example, file system data having a layer structure) suitable for the image recording medium 118. The converted image data is recorded into the image recording medium 118. The image data is also input into the digital signal processing unit 112 and is subjected to the resolution conversion processing. After that, it is converted into a signal (for example, an analog signal of an NTSC system, or the like) suitable for the image display apparatus 120 by the display unit 121 and is displayed to the image display apparatus 120.

In this instance, in response to a control signal from the system control unit 122, the digital signal processing unit 112 may output the digital image signal to the image memory 117 or the recording unit 119 as it is as image data without performing any signal processing to the digital image signal. When there is a request from the system control unit 122, the digital signal processing unit 112 outputs the digital image signal generated in the signal processing step or information of the image data to the system control unit 122. As information of the image data, for example, there is information such as spatial frequency of the image, average value of a designated area, data amount of a compressed image, and the like or information extracted therefrom. Further, when there is a request from the system control unit 122, the recording unit 119 outputs information such as type, free space capacity, and the like of the image recording medium 118 to the system control unit 122.

The reproducing operation in the case where the image data has been recorded in the image recording medium 118 will now be described.

The recording unit 119 reads out the image data from the image recording medium 118 in accordance with a control signal from the system control unit 122. Similarly, if the image data is a compressed image, in response to a control signal from the system control unit 122, the digital signal processing unit 112 executes an image expansion processing and stores the expanded data into the image memory 117. The image data stored in the image memory 117 is subjected to the refocus processing and the resolution conversion processing by the digital signal processing unit 112. After that, it is converted into a signal suitable for the image display apparatus 120 by the display unit 121 and is displayed to the image display apparatus 120.

Figure 2:
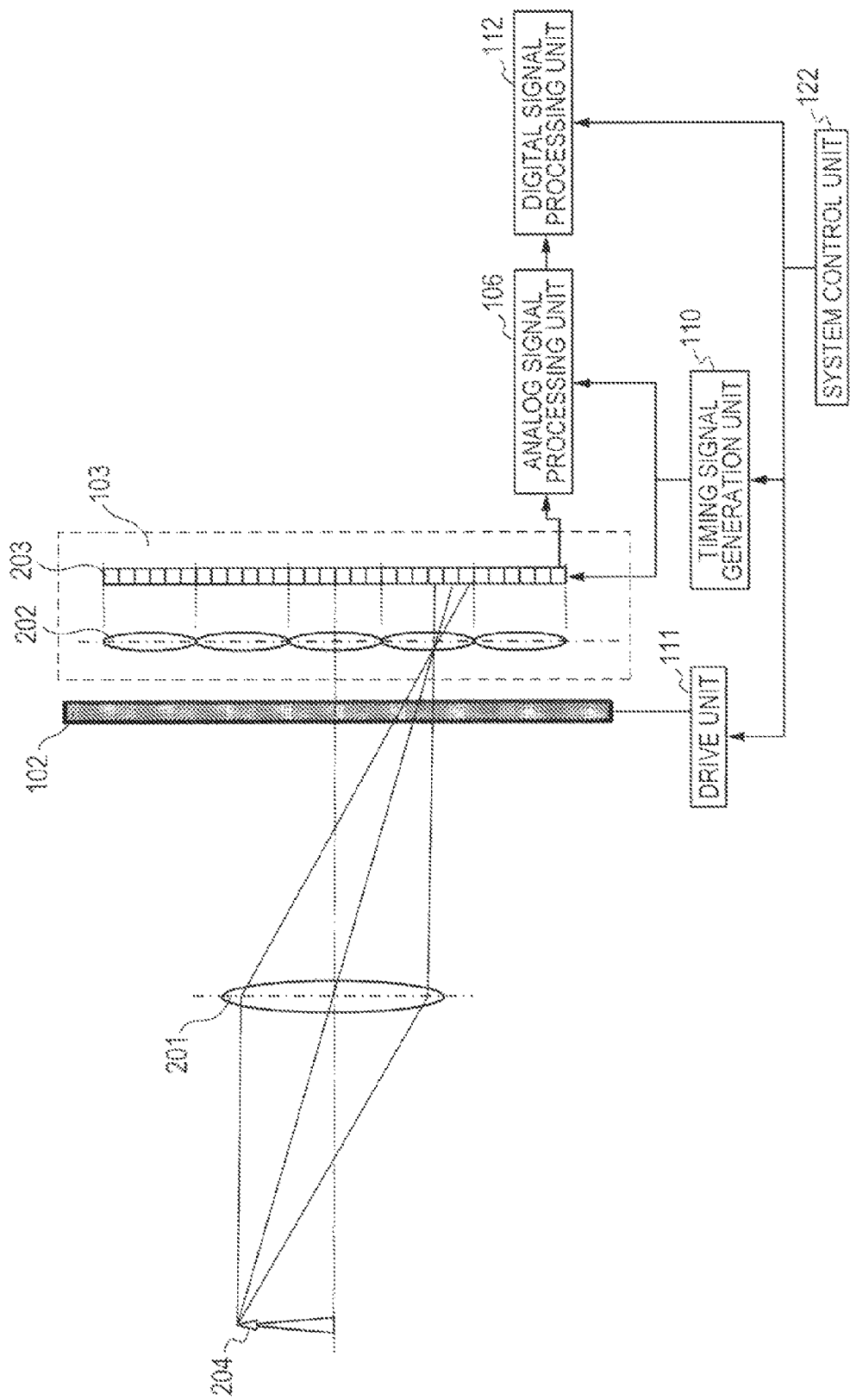
FIG. 2 is a block diagram of a construction according to an image pickup optical system of the image pickup apparatus illustrated in FIG. 1.

FIG. 2 is a block diagram illustrating a construction according to an image pickup optical system of the image pickup apparatus according to the present embodiment. In the diagram, substantially the same component elements as those in FIG. 1 are designated by the same reference numerals and their description is omitted.

In FIG. 2, a photographing lens 201 and an MLA 202 serving as a component element of the image pickup element 103 are provided. A sensor array 203 also serving as a component element of the image pickup element 103 includes an array of a plurality of pixels (photoelectric conversion elements). A reference numeral 204 denotes an object.

The image pickup operation of the image pickup apparatus according to the present embodiment will be described hereinbelow with reference to FIG. 2.

In a state where the mechanical shutter 102 is opened by the drive unit 111, an image of the object 204 is formed onto the image pickup element 103 by the photographing lens 201. A photosignal which entered the image pickup element 103 is further converged by each microlens (hereinbelow, abbreviated to an ML) of the MLA 202 and enters each pixel of the sensor array 203. A construction of the MLA 202 and sensor array 203 will be described hereinafter with reference to FIG. 3. The photosignal which entered the sensor array 203 is photoelectrically converted in each pixel of the image pickup element 103 and is output as an electric signal. Subsequent processings are executed in a manner similar to that described with reference to FIG. 1.

Figure 3:
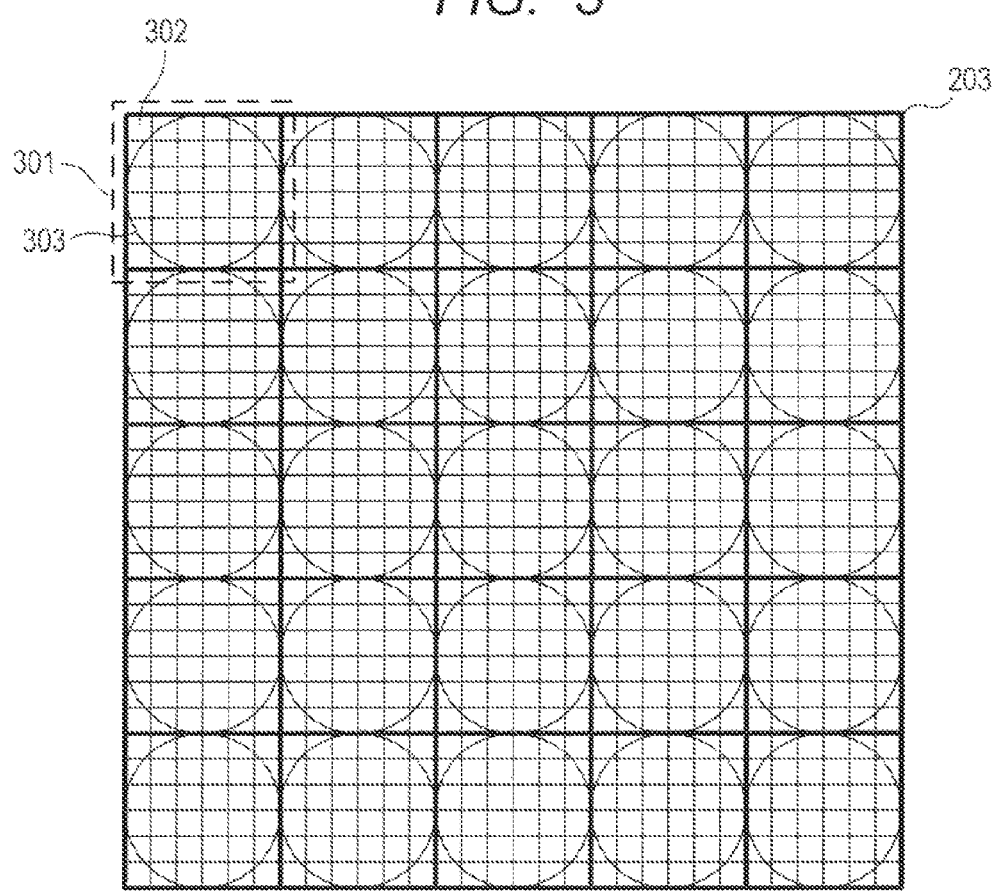
FIG. 3 is a diagram schematically illustrating a pixel array of an image pickup element of the image pickup apparatus in FIG. 1.

FIG. 3 is a diagram schematically illustrating a pixel array in the case where the image pickup element which is used in the image pickup apparatus according to the present embodiment is viewed on the object side.

In FIG. 3, a unit pixel 301 corresponds to one pixel of the image after the reconstruction. The unit pixel 301 is constructed by a predetermined number (6 rows×6 columns) of photoelectric conversion elements (hereinbelow, also referred to as division pixels) 302. One ML 303 is arranged for every unit pixel 301.

In the present embodiment, as illustrated in FIGS. 2, 3, and 6, a pixel array of the sensor array is set to an array of the unit pixels of (5 rows×5 columns) each comprising division pixels of (6 rows×6 columns) for convenience of description. However, in the actual image pickup apparatus, it is assumed that millions to tens of millions unit pixels are arranged.

FIG. 4 is a diagram illustrating an array arrangement of the division pixels in the unit pixel 301.

As described in FIG. 3, the unit pixel 301 is constructed by arranging the 36 (=6×6) division pixels 302. For the subsequent description, in the present embodiment, it is assumed that the 36 division pixels are labeled by $p_{11}$ to $p_{66}$ as shown in FIG. 4, respectively.

FIG. 5 is a diagram illustrating a pupil division in the case where an aperture of the photographing lens 201 is viewed from the direction of the photographing object.

As illustrated in FIG. 5, in the case where a pupil area of the photographing lens 201 is divided into areas of the same number as the number of pixels existing under one ML, an image of light from one pupil division area of the photographing lens 201 is formed in one division pixel. It is now assumed that F numbers of the photographing lens and the ML almost coincide. When pupil division areas of the photographing lens illustrated in FIG. 5 are respectively labeled by $a_{11}$ to $a_{66}$, a correspondence relation between the pupil division areas $a_{11}$ to a $a_{66}$ of the photographing lens and the division pixels areas $p_{11}$ to $p_{66}$ illustrated in FIG. 4 is of point symmetry when viewed from the direction of the optical axis. Therefore, an image of light which exits from the pupil division area $a_{11}$ of the photographing lens is formed in the division pixel $p_{11}$ of the unit pixel 301 existing behind the ML. In a manner similar to that mentioned above, an image of light which exits from the pupil division area $a_{11}$ and passes through another ML is also formed in the division pixel $p_{11}$ of the unit pixel 301 existing behind such an ML.

FIG. 6 is a diagram illustrating traces of rays of light which enter from objects existing at various distances in the image pickup optical system according to the present embodiment.

In FIG. 6, the light which exit from pupil areas $a_1$ to $a_6$ of the photographing lens 201 and pass through the ML are received by division pixels $p_1$ to $p_6$ of the rear corresponding unit pixel, respectively.

The object 601a is an object arranged at a position where its image is formed onto a plane A including the MLA 202 by the photographing lens 201. Among the rays of light which exit from the object 601a, the ray of light which passes through the outermost circumference of the photographing lens and enters the sensor array 203 through the ML existing on the optical axis is shown by a solid line.

The object 601b is an object arranged at a remote position than the object 601a when viewed from the photographing lens 201. An image of the object 601b formed by the photographing lens 201 is formed onto a plane B closer to the photographing lens than the plane A including the MLA 202. Among the rays of light which exit from the object 601b, the ray of light which passes through the outermost circumference of the photographing lens and enters the sensor array 203 through the ML existing on the optical axis is shown by a broken line.

The object 601c is an object arranged at a near position than the object 601a when viewed from the photographing lens 201. An image of the object 601c formed by the photographing lens 201 is formed onto a plane C farther from the photographing lens than the plane A including the MLA 202. Among the rays of light which exit from the object 601c, the ray of light which passes through the outermost circumference of the photographing lens and enters the sensor array 203 through the ML existing on the optical axis is shown by an alternate long and short dash line.

As shown by the trace of each ray of light illustrated in FIG. 6, the division pixel in the sensor array 203 into which the ray of light from the object enters differs in dependence on a distance from the photographing lens 201 to the object 601. A positional relationship between such a distance and the division pixel gives the ray directional information. By using such a principle, the image pickup apparatus having such a construction as mentioned above reconstructs an image signal after the photographing, thereby enabling an image focused onto the objects existing at various distances to be generated (refocus processing).

As described with reference to FIG. 6, since the division pixels $p_{11}$ to $p_{66}$ shown in FIG. 4 have received the light which pass through the different pupil areas for the photographing lens, by using those information, the operation for detecting the distance to the object can be also executed.

Figure 7A:
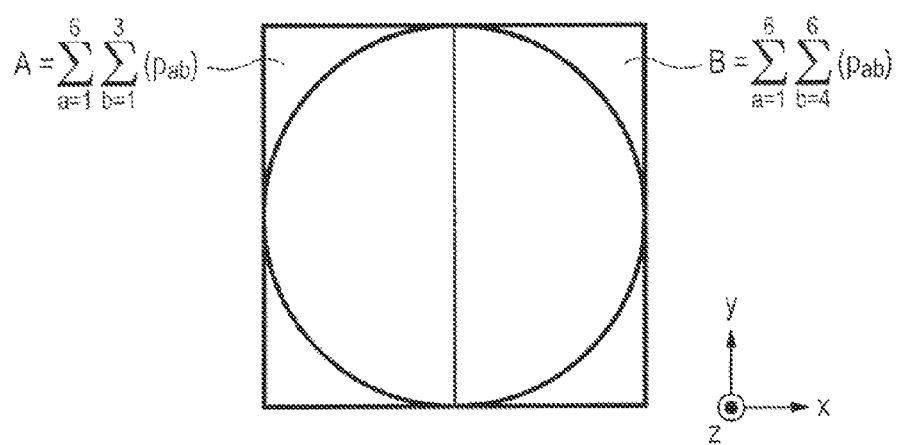
FIGS. 7A and 7B are diagrams for describing the detecting operation of an object distance by the image pickup optical system in FIG. 2.
Figure 7B:
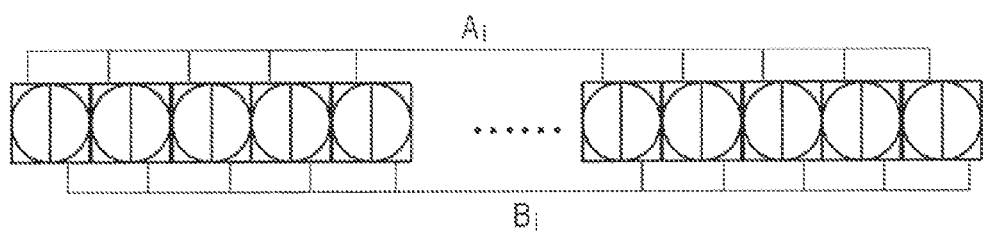

FIGS. 7A and 7B are diagrams for describing the detecting operation of an object distance in the image pickup apparatus according to the present embodiment.

As illustrated in FIG. 7A, the outputs $p_{11}$ to $p_{66}$ of the division pixels corresponding to each microlens are added and two signals which were pupil-divided in the horizontal direction are formed as shown by the following equations (1) and (2).

$$A = \sum_{a=1}^{6} \sum_{b=1}^{3} (P_{ab}) \tag{1}$$

$$B = \sum_{a=1}^{6} \sum_{b=4}^{6} (P_{ab}) \tag{2}$$

As illustrated in FIG. 6, the pupil area of the photographing lens which is observed by each combined signal A shown by the equation (1) receives the light flux which pass through the exit pupil areas $a_1$ to $a_3$ of the photographing lens. On the basis of this, a one-dimensional image signal $A_i$ (i=1, 2, 3, . . . , n) is generated by arranging $A_1$ to $A_n$ obtained from a pixel group corresponding to the n MLs arranged continuously in the horizontal direction as illustrated in FIG. 7B.

Similarly, when a one-dimensional image signal $B_i$ (i=1, 2, 3, . . . , n) is generated by arranging combined signals B which are calculated by the equation (2), $A_i$ and $B_i$ are signals viewing the right side and the left side of the exit pupil of the photographing lens, respectively. Therefore, by detecting relative positions of $A_i$ and $B_i$ and multiplying a relative deviation amount therebetween with a predetermined conversion coefficient, the distance detecting operation based on the phase difference detecting method can be executed.

By generating $A_i$ and $B_i$ at an arbitrary position in the display screen, a focus position (defocus amount) at that position can be calculated. Therefore, by driving the focus lens in accordance with a calculation result, the automatic focus adjustment can be also performed.

Figure 8:
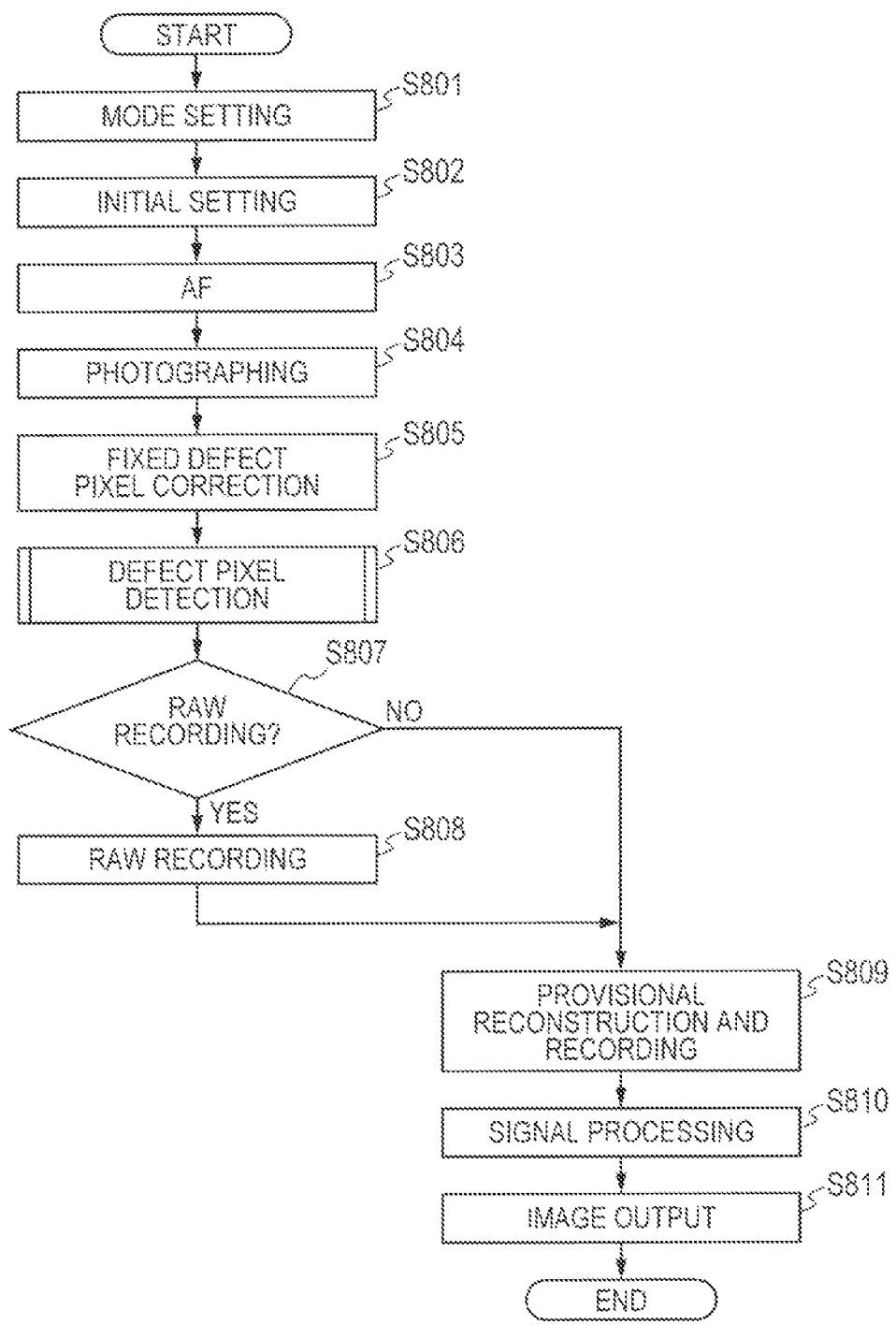
FIG. 8 is a diagram illustrating a flowchart for the photographing operation of the image pickup apparatus according to the first embodiment of the invention.

FIG. 8 is a diagram illustrating a flowchart for the photographing operation of the image pickup apparatus according to the present embodiment.

In FIG. 8, first, the mode such as still image photographing, moving image photographing, focus detecting photographing, or the like is set by the system control unit 122 on the basis of an input or the like by the photographing mode setting unit 125 (step S801). Subsequently, the system control unit 122 performs an initial setting of the photographing conditions such as sensitivity, iris value, exposure time, and the like in accordance with the set mode (step S802).

Subsequently, the system control unit 122 starts the automatic focus adjustment, that is, what is called an auto focus (AF) for automatically driving the focus lens so as to focus onto the object (step S803). As an AF method, besides the method using a contrast detection, a method using a dedicated distance measuring sensor or the like is also known. Further, by using the feature of the light field camera according to the present embodiment, the signals of the photoelectric conversion elements existing in the different quadrants under the microlens are properly read out, and those signals can be also used as signals of the phase difference detecting method AF. Such a method is as mentioned above with reference to FIGS. 7A and 7B.

In accordance with a result of the AF, the system control unit 122 drives the focus lens of the photographing optical system 101 through the drive unit 111.

Subsequently, in response to a depression of a release button (not shown), the system control unit 122 controls the mechanical shutter 102 and exposes the image pickup element 103 (step S804).

Subsequently, the system control unit 122 reads out information of a fixed defect pixel which is previously extracted in the producing step of the image pickup apparatus from the nonvolatile memory 123 and performs the correction of the relevant pixel by controlling the image correction unit 113 (step S805).

Subsequently, a defect pixel detection in the photographed image is performed by the defect pixel detection unit 114 of the digital signal processing unit 112 (step S806). A defect pixel detecting method will be described in detail hereinafter with reference to FIGS. 9, 10A, and 10B. The detected defect pixel is corrected in the digital signal processing unit 112.

After that, the system control unit 122 discriminates whether or not the RAW recording mode is selected by the photographing mode setting unit 125 or the like (step S807). If the RAW recording mode is selected, the picked-up image is recorded in what is called an RAW mode for recording the picked-up image as it is into the recording medium 118 (step S808). Irrespective of the RAW recording mode, by adding up the signals of the photoelectric conversion elements under the same ML, a provisional reconstruction image having the same number of pixels as that of the MLs in the MLA 202 or a thumbnail image reduced in order to display the provisional reconstruction image is generated and recorded (step S809).

After that, in the case where the focus lens position decided in the AF in step S803 differs from a desired position of the photographer, or the like, a distance of a target object (for example, 601b in FIG. 6) and the object of the provisional reconstruction image displayed on the display apparatus 120 are designated. Such a designation is performed by a refocus distance setting unit (not shown in FIG. 1). When they are designated, the system control unit 122 allows the image processing unit 116 to execute the refocus reconstruction processing to the picked-up image in which the defect pixel is detected in step S806 and corrected (picked-up image serving as a subject of the RAW recording) (step S810).

If the picked-up image is recorded in the RAW recording mode, since the refocus reconstruction processing may be executed after the photographing, the processings in step S809 and subsequent steps may be executed by an image processing apparatus which simulates a part of the image pickup apparatus in FIG. 1 or by a computer or the like according to an image processing method recorded in the memory or the like.

Finally, the image signal is output to the image memory 117, recording unit 119, or display unit 121 (step S811) and the photographing operation is finished.

Subsequently, a detection construction of the defect pixel according to the present embodiment will be described with reference to FIGS. 9, 10A, and 10B.

In the light field camera according to the present embodiment, as already mentioned above, the image in which the signals are arranged in order of the outputs from the image pickup element does not always have the arrangement according to the positional relationship of the object images but is the data which is also accompanied with discontinuous portions. Therefore, in the case of performing the real-time defect pixel detection, it is difficult to discriminate whether the relevant pixel is a defect, based on all of the peripheral pixel signals like a real-time defect pixel detection in the related art. The present embodiment, therefore, is constructed in such a manner that while discriminating whether or not the defect pixel detection can be performed, the detection of the defect pixel is performed.

Figure 9:
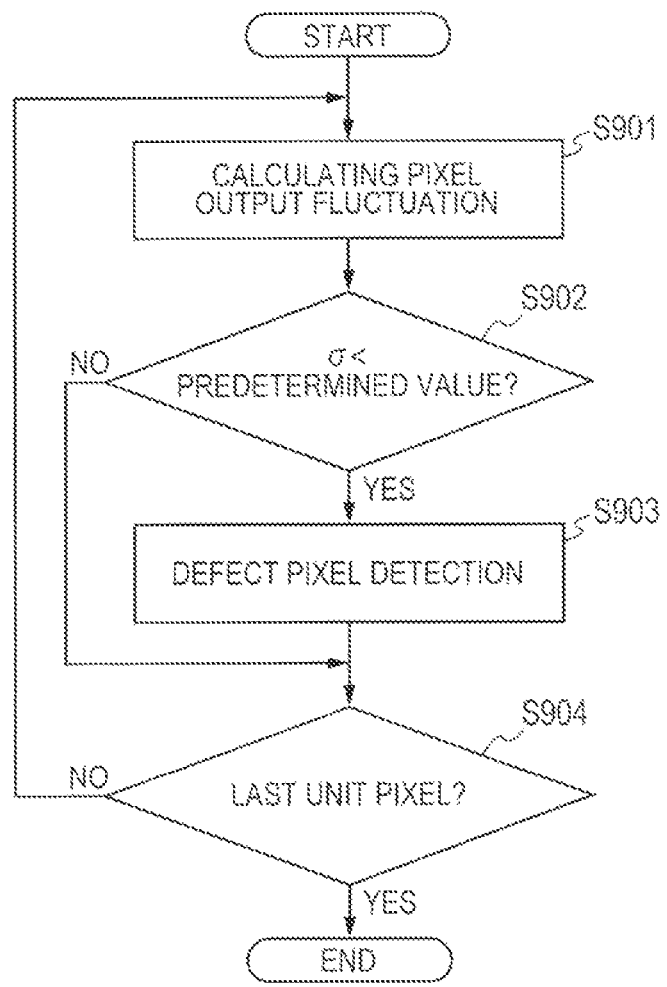
FIG. 9 is a diagram illustrating a flowchart for the detecting operation of a defect pixel according to the first embodiment of the invention.

FIG. 9 is a diagram illustrating a flowchart for the detecting operation of a defect pixel according to the present embodiment.

In FIG. 9, when the defect pixel detection is started under control of the system control unit 122, first, a fluctuation of the output signals of the 36 division pixels 302 constructing one unit pixel 301 included in the pixel array is calculated (step S901). In the present embodiment, a standard deviation $\sigma$ is used as a numerical value showing the fluctuation. However, it is an example and another value may be used so long as it can express the fluctuation of the output signals of the division pixels 302.

Subsequently, whether or not the standard deviation $\sigma$ calculated in step S901 is smaller than a predetermined value is discriminated (step S902).

In the description in step S902, if it is determined that the standard deviation $\sigma$ is smaller than the predetermined value, the defect pixel detection is performed to the division pixels 302 in the unit pixel 301 (step S903). Specifically speaking, if there is a division pixel 302 having an output signal value such that a difference value between that output signal value and an average value of the output signals of the 36 division pixels 302 does not fall within a predetermined range, such a pixel is detected as a defect pixel.

In the description in step S902, if it is determined that the standard deviation $\sigma$ is larger than the predetermined value, it is decided that a precision adapted to detect the defect pixel is not guaranteed to the division pixels 302 in such a unit pixel 301, and the defect pixel detection is not performed.

After that, whether or not the unit pixel 301 to which the detection is performed is a last unit pixel is discriminated (step S904). If there are still unit pixels to which the detection is not performed yet, the processing routine is returned to step S901 and the discrimination about the next unit pixel is performed. If it is determined that the detection of the last unit pixel is finished, the defect pixel detecting routine is finished.

FIGS. 10A and 10B are diagrams for describing a detecting method according to the present embodiment.

FIG. 10A is a diagram showing an output level of each division pixel in the case where a luminance difference in the area of the object from which the subject unit pixel 301 receives the light is small. In FIG. 10A, it is assumed that the division pixel $p_{25}$ is a defect pixel.

In the state of FIG. 10A, since a difference of a photosignal amount of each division pixel is small, the standard deviation value σ showing the fluctuation of the output signals is small. Therefore, the image pickup apparatus according to the invention determines that this unit pixel is a pixel in which the defect pixel detection can be performed. The division pixel $p_{25}$ in which the difference from the signal output value of another division pixel is large is detected as a defect pixel.

FIG. 10B is a diagram showing an output level of each division pixel in the case where the luminance difference in the area of the object from which the subject unit pixel 301 receives the light is large. In FIG. 10B, it is also assumed that the division pixel $p_{25}$ is a defect pixel.

In the state of FIG. 10B, since the difference of the photosignal amount of each division pixel is large, the standard deviation value σ showing the fluctuation of the output signals is large. Therefore, the image pickup apparatus according to the invention determines that the defect pixel detection should not be performed with respect to this unit pixel.

As a detecting method of the defect pixel according to the present embodiment described with reference to FIGS. 9, 10A, and 10B, a method whereby the defect pixel is detected by comparing with the average value of the output values of all of the division pixels in the unit pixel is used. However, the invention is not limited to such a method but the output signal amount may be compared with those of only the peripheral pixels of the detection subject pixel.

Although the method of comparing the division pixels in one unit pixel has been described above, the invention is not limited to it. For example, the following methods can be also combined and used: that is, a method whereby the division pixels existing at the same position in the respective peripheral unit pixels are compared; and a method whereby the pixels which output absolute values which are not obviously proper such as values which are fairly smaller than a dark level are detected, or the like.

In the foregoing embodiment, it is determined that when the standard deviation value is smaller than the predetermined value, the defect division pixels in the unit pixel are detected. The division pixel having the output signal value in which the difference value from the average value of the output signals of the division pixels in the unit pixel does not lie within the predetermined range is detected as a defect pixel. In this case, it is considered that the smaller the standard deviation is, the smaller the fluctuation range of the difference value is. Therefore, it is also possible to construct a detection method in such a manner that when the defect pixel is detected, the predetermined range is changed to a small range in accordance with the decrease in standard deviation value, thereby raising the detection precision of the defect pixel.

Or, since the area which is not focused in the image appears almost to be a uniform luminance area, it is also possible to construct a detection method in such a manner that a defocus amount of the peripheral area of the detection subject unit pixel of the defect pixel is calculated and, when it is larger than a predetermined value, a discrimination range of the difference value is decreased.

Second Embodiment

The present embodiment has such a construction that the operational construction such that even after the refocus image is reconstructed, the detection and correction of the defect pixel are performed by the digital signal processing unit 112 is added to the operation of the image pickup apparatus of the first embodiment. Therefore, since the construction of the image pickup apparatus itself in the present embodiment is similar to that of FIG. 1, its description is omitted here.

Figure 11:
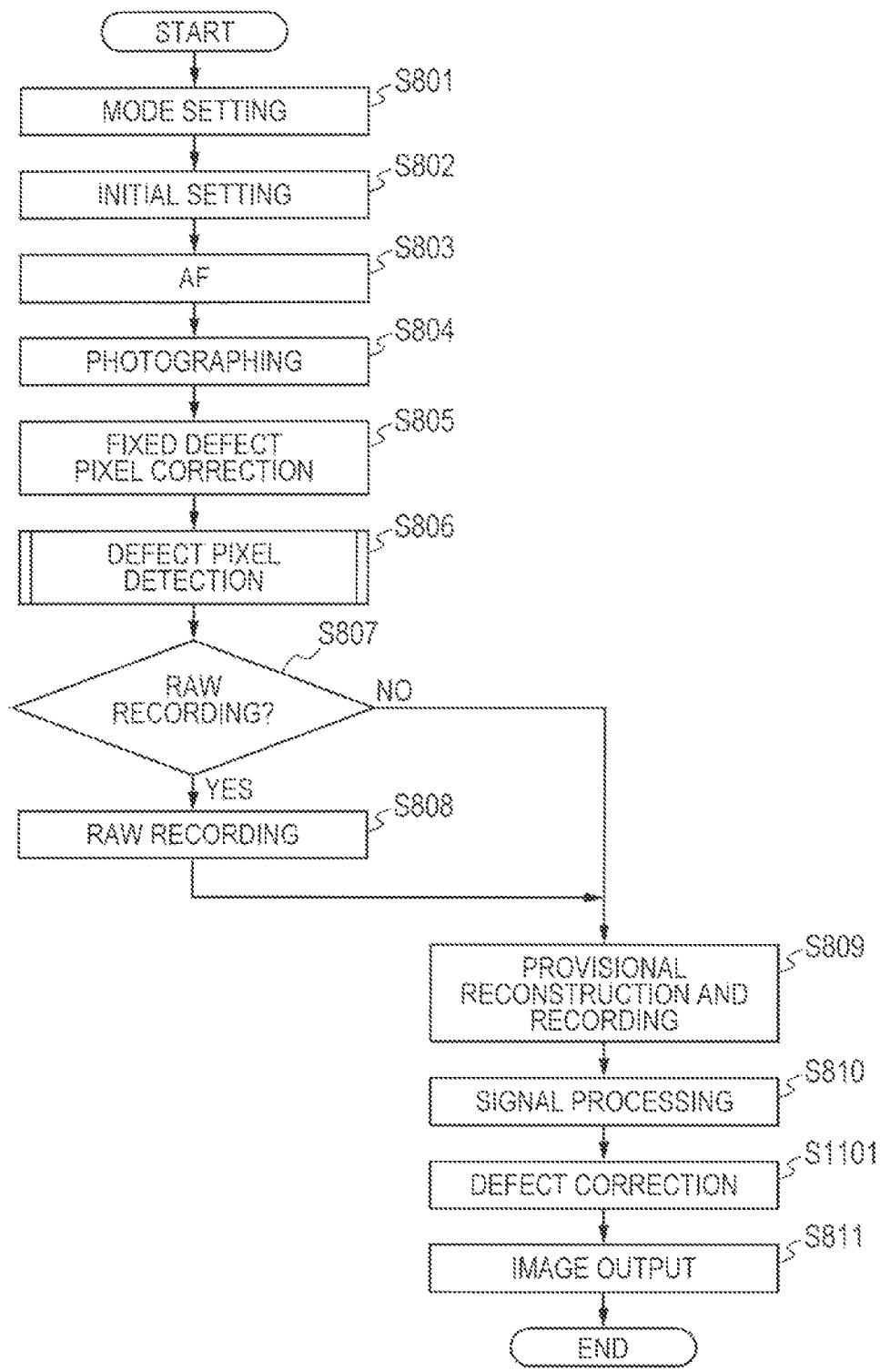
FIG. 11 is a diagram illustrating a flowchart for the photographing operation of an image pickup apparatus according to the second embodiment of the invention.

FIG. 11 is a diagram illustrating a flowchart for the photographing operation according to the second embodiment. In the flowchart, substantially the same processing steps as those in FIG. 8 are designated by the same step numbers. FIG. 11 differs from FIG. 8 with respect to only a point that a defect correction (step S1101) is added after the image processing of step S810 of reconstructing the refocus image. Therefore, in the present embodiment, only the defect correction in step S1101 will be described. When the setting by the refocus distance setting unit is not performed, the defect pixel correction in step S1101 as well as the signal processing (refocus processing) of step S810 is performed. Whether or not the execution of the detection and correction processings of the defect pixel in the present embodiment are permitted or inhibited may be decided in accordance with the number of unit pixels in which the fluctuation of the pixel outputs which is calculated in step S901 is large and with their distribution area of those unit pixels. Those processings can be performed under control of the system control unit 122.

The detection of the defect pixel in step S1101 is performed to the pixel of the reconstructed image (pixel in which the division pixels were added). The detecting method in this case is performed by discriminating a level difference from the average value or median value of the peripheral pixels of the detection subject pixel. However, the detecting method is not limited to it. For example, as disclosed in Japanese Patent Application Laid-Open No. 2005-286825, a plurality of discrimination processings may be provided in order to avoid such a situation that the pixel is determined as a defect pixel from the difference value in the edge portion.

According to the foregoing construction of the present embodiment, the image quality of the reconstruction image can be further improved by correcting the defect pixel which is not corrected in step S806. Since the division pixels which are detected in step S806 and corrected are merely added as one division pixel in the reconstruction of the refocus image, such a correction becomes inconspicuous in the reconstruction image and the effect of the correction in step S1101 is not decreased.

Although the present embodiments of the invention have been described above with reference to FIGS. 1 to 11, the invention is not limited to it but various forms can be also used.

For example, in the pixel arrangement of the present embodiment of the invention, in order to easily describe the pixel structure, the number of division pixels under the same ML is set to (6×6). However, the invention is not limited to it but the unit pixel may be constructed so as to have any number of division pixels of an arbitrary shape.

Although the present embodiments of the invention have been described above on the assumption that the correction of the detected defect pixel and the fixed defect pixel which has previously been extracted in the producing step or the like is performed prior to the reconstruction such as a refocus or the like. However, the invention is not limited to it but may be constructed in such a manner that the detection of the defect pixel is performed prior to the reconstruction and the system control unit 122 holds the detection result and corrects the pixels of the image after the reconstruction on the basis of the held detection result.

In the present embodiment of the invention described with reference to FIG. 1, it has been described above on the assumption that the image processing such as an image reconstruction or the like is executed by the digital signal processing unit 112 serving as one of the component elements of the image pickup apparatus under control of the system control unit 122. However, it is not always necessary that the image processing is executed in the image pickup apparatus. Specifically speaking, it is also possible to construct in such a manner that the image processing unit is provided in another apparatus, for example, a PC (Personal Computer) or the like, the image pickup data obtained by the image pickup apparatus is transferred to the PC, and the image processing is executed in the PC. In this case, a CPU of the PC plays a role of the system control unit.

Each unit constructing the image processing apparatus in the present embodiments of the invention mentioned above and each processing step of the image processing method can be realized by a method whereby the program stored in the RAM, ROM, or the like of the CPU operates. The program and a computer-readable storage medium in which the program has been stored are incorporated in the invention.

The invention can be also embodied as, for example, a system, an apparatus, a method, a program, a storage medium, or the like. Specifically speaking, the invention can be also applied to a system constructed by a plurality of apparatuses or to an apparatus constructed by one equipment.

The invention incorporates a case where a program of software for realizing the functions of the present embodiments as mentioned above (program corresponding to the flowchart of FIG. 8, 9, or 11 in the present embodiments) is directly supplied to a system or apparatus or is supplied from a remote place. The invention also incorporates a case where a computer of the system or apparatus reads out and executes a program code of the supplied program.

Therefore, the program code itself which is installed into a computer in order to realize the functions and processings of the invention by the computer also realizes the invention. That is, a computer program itself for realizing the functions and processings of the invention is also incorporated in the invention. In this case, any form such as object code, program which is executed by an interpreter, script data which is supplied to the OS, or the like may be used so long as it has the functions of the program.

As a storage medium for supplying the program, for example, there is a flexible disk, a hard disk, an optical disk, a magnetooptic disk, or the like. Further, there is an MO, a CD-ROM, a CD-R, a CD-RW, a magnetic tape, a nonvolatile memory card, a ROM, a DVD (DVD-ROM, DVD-R), or the like.

As another program supplying method, there is a method whereby a computer is connected to Homepage of the Internet by using a browser of a client computer. The program can be also supplied by supplying the computer program itself of the invention from Homepage or by downloading a compressed file including an automatic installing function into a storage medium such as a hard disk or the like.

The program supplying method can be also realized by a method whereby the program code constructing the program of the invention is divided into a plurality of files and each file is downloaded from different Homepage. That is, a WWW server for allowing a plurality of users to download a program file for realizing the functions and processings of the invention by the computer is also incorporated in the invention.

As another method, the program supplying method can be also realized by a method whereby the program of the invention is encrypted, stored into the storage medium such as a CD-ROM or the like, and distributed to the users, the users who can clear predetermined conditions are allowed to download key information for decrypting the encryption from Homepage through the Internet, and by using the key information, the encrypted program is executed and installed into the computer.

The functions of the present embodiments mentioned above are realized by a method whereby the computer executes the read-out program. Further, the functions of the present embodiments mentioned above are also realized by a method whereby the OS or the like which operates on the computer executes a part or all of actual processings on the basis of instructions of the program, and those functions are realized by those processings.

Further, as another method, the functions of the present embodiments mentioned above are also realized by a method whereby the program which is read out of the storage medium is written into a memory provided for a function expanding board inserted in a computer or a function expanding unit connected to the computer, a CPU or the like provided for the function expanding board or function expanding unit executes a part or all of actual processings on the basis of instructions of the program, and those functions are realized by those processings.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-199449 filed on Sep. 11, 2012, which is hereby incorporated by reference herein in its entirety.

What is claimed is:

1. An image processing apparatus for processing a picked-up image which is output from an image pickup element having a microlens array, a plurality of pixels of the image pickup element being assigned to one microlens of the microlens array, configured to pick up an image, comprising:
   an obtaining unit configured to obtain the picked-up image which is output from the image pickup element;
   a refocus processing unit configured to perform image processing on the obtained picked-up image based on ray directional information of the obtained picked-up image as refocus processing so as to generate a reconstruction image whose focal length is different from a focal length of the obtained picked-up image;
   a defect pixel detection unit configured to detect a defect pixel from the obtained picked-up image; and
   a control unit configured to control the refocus processing unit and the defect pixel detection unit in such a manner that makes the defect pixel detection unit perform the detection of the defect pixel of the obtained picked-up image, and makes the refocus processing unit perform the refocus processing after performing the detection of the defect pixel on the picked-up image in which the detection of the defect pixel is performed.

2. The apparatus according to claim 1, wherein each microlens constructing the microlens array corresponds to a predetermined number of photoelectric conversion elements among photoelectric conversion elements constructing the image pickup element, and the defect pixel detection unit calculates a standard deviation of output values of the predetermined number of photoelectric conversion elements and decides whether or not the detection of the defect pixel is to be performed, from the outputs of the predetermined number of photoelectric conversion elements on the basis of a value of the calculated standard deviation.

3. The apparatus according to claim 2, wherein the defect pixel detection unit detects, as a defect pixel, the photoelectric conversion element corresponding to the output having a difference from an average value of the outputs of the predetermined number of photoelectric conversion elements, which does not fall within a predetermined range of a value, among the outputs of the predetermined number of photoelectric conversion elements.

4. The apparatus according to claim 2, wherein if a difference between the output of each of the predetermined number of photoelectric conversion elements corresponding to each microlens and the output of each of a plurality of peripheral photoelectric conversion elements is not equal to a value falling within a predetermined range, the defect pixel detection unit detects each of the photoelectric conversion elements as a defect pixel.

5. The apparatus according to claim 3, wherein if it is determined that the detection of the defect pixel is performed on the basis of the value of the calculated standard deviation, the defect pixel detection unit changes a size of the predetermined range in accordance with the value of the calculated standard deviation.

6. The apparatus according to claim 5, wherein when the value of the standard deviation of the outputs of the predetermined number of photoelectric conversion elements is small, the defect pixel detection unit decreases the size of the predetermined range.

7. The apparatus according to claim 2, wherein if it is determined that the detection of the defect pixel is performed on the basis of the value of the calculated standard deviation, the defect pixel detection unit changes a size of a predetermined range in accordance with a defocus amount of a peripheral picked-up image of the predetermined number of photoelectric conversion elements.

8. The apparatus according to claim 1, further comprising a refocus distance setting unit configured to set an object distance of the reconstruction image which is generated by the refocus processing unit.

9. The apparatus according to claim 1, further comprising a first defect pixel correction unit configured to correct the defect pixel detected by the defect pixel detection unit.

10. The apparatus according to claim 9, further comprising:
a memory which records a position of the defect pixel of photoelectric conversion elements constructing the image pickup element is recorded; and
a second defect pixel correction unit configured to correct a signal of the defect pixel on the basis of the recorded position.

11. The apparatus according to claim 10, further comprising a third defect pixel correction unit configured to detect the defect pixel of the reconstruction image which is generated by the refocus processing unit and correct the defect pixel.

12. The apparatus according to claim 11, wherein the control unit determines whether or not the correction of the defect pixel of the reconstruction image by the third defect pixel correction unit is performed in accordance with a result of the defect pixel detection of the defect pixel detection unit.

13. The apparatus according to claim 9, wherein the control unit holds the detection result of the defect pixel of the defect pixel detection unit, controls the first defect pixel correction unit, and performs the defect pixel correction of the reconstruction image on the basis of the held detection result.

14. An image processing method of processing a picked-up image which is output from an image pickup element having a microlens array, a plurality of pixels of the image pickup element being assigned to one microlens of the microlens array, configured to pick up an image, comprising:
obtaining the picked-up image which is output from the image pickup element;
performing image processing on the obtained picked-up image based on ray directional information of the obtained picked-up image as refocus processing by a refocus processing unit so as to generate a reconstruction image whose focal length is different from a focal length of the obtained picked-up image;
detecting a defect pixel from the obtained picked-up image by a defect pixel detection unit; and
controlling the refocus processing unit and the defect pixel detection unit in such a manner that makes the defect pixel detection unit perform the detection of the defect pixel of the obtained picked-up image, and makes the refocus processing unit perform the refocus processing after performing the detection of the defect pixel on the picked-up image in which the detection of the defect pixel is performed.

15. A non-transitory computer-readable storage medium storing a program comprising a program code for causing a computer to execute the image processing method according to claim 14.

16. An image pickup apparatus comprising:
a photographing optical system;
an image pickup element having a microlens array, a plurality of pixels of the image pickup element being assigned to one microlens of the microlens array, configured to pick up an image;
an image processing apparatus comprising:
an obtaining unit configured to obtain the picked-up image which is output from the image pickup element,
a refocus processing unit configured to perform image processing on the obtained picked-up image based on ray directional information of the obtained picked-up image as refocus processing so as to generate a reconstruction image whose focal length is different from a focal length of the obtained picked-up image,
a defect pixel detection unit configured to detect a defect pixel from the obtained picked-up image, and
a control unit configured to control the refocus processing unit and the defect pixel detection unit in such a manner that makes the defect pixel detection unit perform the detection of the defect pixel of the obtained picked-up image, and makes the refocus processing unit perform the refocus processing after performing the detection of the defect pixel on the picked-up image in which the detection of the defect pixel is performed; and an output unit configured to output at least one of the picked-up image and the reconstruction image.

17. The apparatus according to claim 1, wherein the defect pixel detection unit detects the defect pixel based on output values of pixels assigned to a same microlens.

* * * * *